United States Patent [19]

Horvath

[11] Patent Number: 4,615,235

[45] Date of Patent: Oct. 7, 1986

[54] VARIABLE RATIO BRAKE PEDAL MECHANISM

[75] Inventor: Robert A. Horvath, Novi, Mich.

[73] Assignee: General Motors Corporation, Detroit, Mich.

[21] Appl. No.: 690,969

[22] Filed: Jan. 14, 1985

[51] Int. Cl.[4] .............................................. G05G 1/04
[52] U.S. Cl. ......................................... 74/516; 74/512
[58] Field of Search .......................... 74/512, 516, 518

[56] References Cited

U.S. PATENT DOCUMENTS

| | | | |
|---|---|---|---|
| 2,706,020 | 4/1955 | Freers et al. | 74/516 |
| 3,382,676 | 5/1968 | Tenniswood | 74/516 |
| 3,858,457 | 1/1975 | Mathues | 74/516 X |
| 3,911,760 | 10/1975 | Elbers et al. | 74/512 |
| 4,386,537 | 6/1983 | Lewis | 74/516 X |

Primary Examiner—Albert J. Makay
Assistant Examiner—Steven E. Warner
Attorney, Agent, or Firm—D. D. McGraw

[57] ABSTRACT

The variable pedal ratio brake actuating mechanism has a first lever pivotally mounted on an arcuately movable brake pedal arm. The lever is guided pivotally by a pivot control lever which pivots about a fixed point at one end and is connected at its other end to a first pivot on the first lever spaced from the first lever pivotal mount. An output member is pivotally connected to a second pivot on the first lever spaced from the first lever pivot mount and first pivot. The first lever is moved translatorily and also arcuately about its pivotal mount as the brake pedal arm moves in the brake actuating direction to change the effective pedal ratio.

2 Claims, 3 Drawing Figures

VARIABLE RATIO BRAKE PEDAL MECHANISM

The invention relates to a brake mechanism which provides low numerical ratios of movement for the initial portion of the brake actuating stroke and increases the numerical ratio of movement as the brake pedal is moved further into the stroke. This provides lower overall travel of a brake pedal since high pedal mechanism output travel is obtained when the brake system requires low output forces and lower pedal mechanism output travel in relation to pedal input travel is provided when higher output forces are required by the vehicle brake mechanism. The brake pedal pivots about a fixed point in an arcuate brake actuating direction and has mounted thereon at an appropriate position a lever control mechanism which is pivoted on the brake pedal arm at a point intermediate the ends of the lever control mechanism. One end of the lever control mechanism is pivotally connected to the brake pedal output member which, in the usual arrangement, is operatively connected to actuate a brake master cylinder. Another portion of the lever control mechanism is connected to and cooperates with another control mechanism element which causes the pivoted lever control mechanism to move arcuately about its pivot point at the same time that it moves in translation during the brake actuating movement of the brake pedal. The net result is a variation in the effective ratio of the brake pedal mechanism from the beginning of the brake stroke through the brake actuation to the completion of the brake stroke at which full braking effort is applied.

The mechanism embodying the invention may also be used as a quick parking brake cable take-up for a parking brake mechanism.

IN THE DRAWINGS

Figure 1:
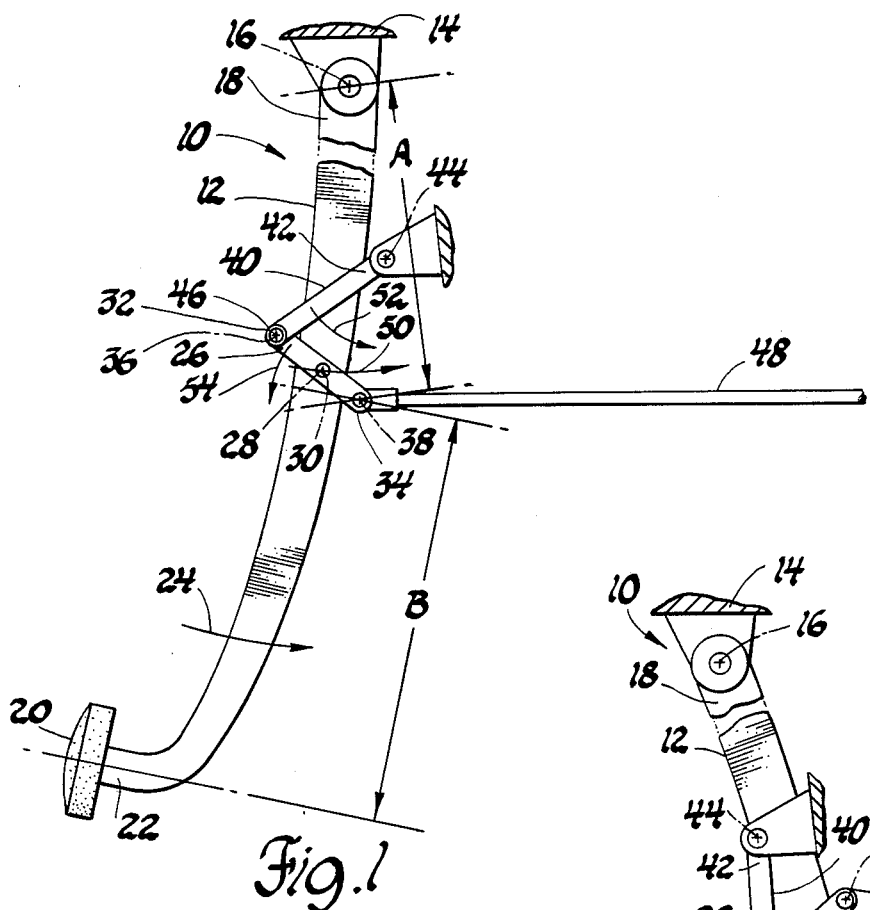
FIG. 1 is a schematic illustration of an embodiment of the invention, showing the mechanism in the brake released position and therefore at the beginning of the brake actuating stroke.

The brake pedal mechanism 10 includes a brake pedal arm 12 which is pivotally movable through a brake actuating stroke relative to a fixed part 14 of the vehicle in which the mechanism is installed. The pedal arm 12 is pivoted about the first fixed pivot point 16 which is located at the upper end 18 of the brake pedal arm 12 and also on the fixed part 14 of the vehicle. The brake pedal 20 is secured to the other end 22 of the brake pedal arm 12 and arranged in the usual well known manner so as to be readily actuated by the foot of a vehicle operator. When the brake pedal arm is moved through the brake actuating stroke it moves through a defined arc indicated by arrow 24. A first lever 26 is pivotally attached at an intermediate point between its ends to an intermediate portion of the brake pedal arm 12. This pivotal attachment is illustrated as being located at the center area pivot point 28 of first lever 26 and the brake pedal arm intermediate pivot point 30 of brake pedal arm 12. The first lever 26 has opposite ends 32 and 34 which are on either side of and spaced from the pivot point 28. A first lever first pivot 36 is located on the first lever end 32 and a first lever second pivot 38 is located on the other first lever end 34. Pivots 36 and 38 are spaced on opposite sides of pivot point 28. A second lever 40 has one end 42 attached at a pivot point 44 on a fixed part of the vehicle and its other end 46 pivotally attached to the first lever at its first pivot 36. A brake pedal mechanism output member 48 has one end attached to the first lever second pivot 38 on the first lever end 34 and extends to the appropriate mechanism to be actuated by the brake pedal mechanism. As is well known in the art, the output member 48 may be a push rod which operatively connects to actuate a master cylinder or may be arranged to move the parking brake cable of a parking brake mechanism.

Since the pivot point 28 is connected to an intermediate portion of brake pedal arm 12, it moves arcuately through the arc illustrated by arrow 50 as the brake pedal arm moves about pivot point 16. Thus the pivot point 28 of the first lever 26 and coincident the pivot point 30 of the brake pedal arm move arcuately, causing lever 26 to be moved in a somewhat translatory manner throughout the brake actuating stroke of the brake pedal mechanism.

Figure 2:
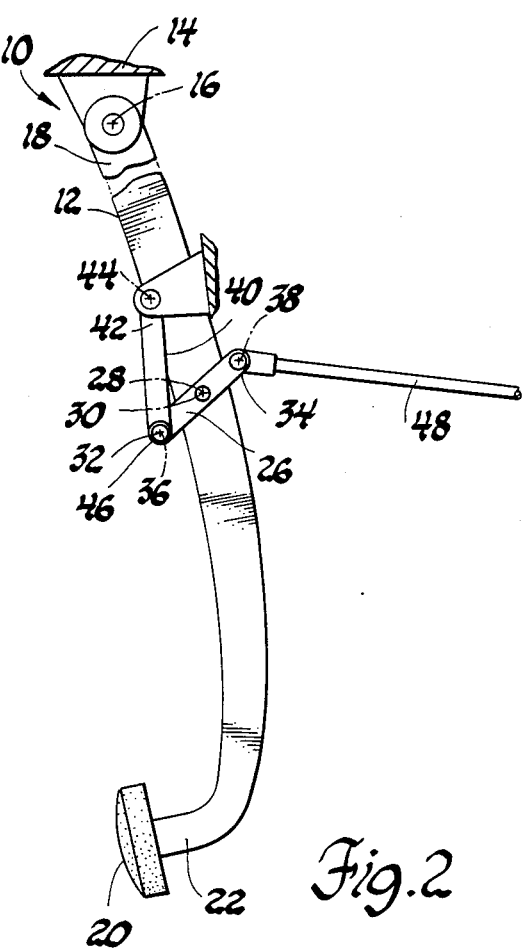
FIG. 2 is a schematic illustration of the mechanism of FIG. 1 showing the mechanism at an intermediate stage of the brake actuating stroke.
Figure 3:
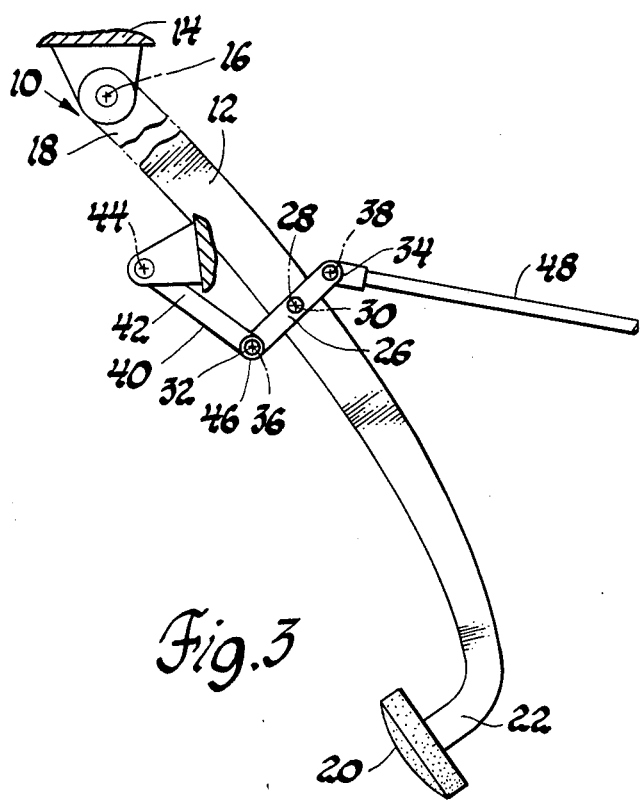
FIG. 3 is a schematic illustration of the mechanism of FIG. 1 and showing the mechanism at substantially the end of the full brake actuating stroke.

The second lever 40 has an arcuate movement, illustrated by arrow 52, about its pivot point 44 as the mechanism is moved through the brake actuating stroke, and acts as a pivot control member for lever 26. The first lever 26 also moves arcuately about its pivot point 28 in an arcuate direction relative to that pivot point as illustrated by arrow 54. Thus the effective distance A between pivot point 16 and the position of the pivot 38, and the effective distance B from the position of the pivot 38 perpendicular to a tangent of the arc of movement of the brake pedal 20, establishes the instantaneous output ratio in relation to brake pedal mechanism input. As can be seen by comparison of FIGS. 2 and 3 with FIG. 1, as the brake pedal 20 is moved through its actuating stroke the effective distance A decreases and the effective distance B increases, giving an increase in brake pedal ratio as the brake actuating stroke proceeds. In the particular mechanism schematically illustrated, the initial ratio of input movement to output movement is the ratio of effective distance A divided by effective distance B, and is about 1:1 or slightly less. As the mechanism has moved to the position shown in FIG. 2, effective distance A is substantially less and effective distance B is substantially more than that illustrated in FIG. 1. Therefore, the travel ratio has decreased so that it is substantially less than 1:1. Expressed in another fashion, the output force ratio has substantially increased in comparison to the mechanism in the position shown in FIG. 1, the force ratio change being the inverse of the ratio of movement change. The change in ratio is maintained and may be slightly increased as the mechanism moves from the intermediate position illustrated in FIG. 2 to the full stroke position illustrated in FIG. 3.

Variations in the lengths of one or more of the first and second levers 26 and 40 and the brake pedal arm 12, as well as locations of the fixed pivot points 16 and 44 and the movable pivots 28, 30, 36 and 38, can be utilized to alter the effective brake pedal mechanism ratios so that the mechanism may be tailored to the desired range of change of brake pedal ratios during the brake actuating stroke as well as the minimum and maximum ratios obtained from the beginning to the end of that stroke. For example, the initial ratio of input movement to output movement may be set to be substantially less than 1:1 (giving substantially more output movement of member 48 than input movement of pedal arm 12), and the final ratio of input movement to output movement may be set to be substantially greater than 1:1 (giving substantially more input movement of pedal arm 12 than output movement of member 48). By way of example, the initial ratio of input movement to output movement may be about 0.7:1 and the final ratio may be about 1.4:1. Other examples which may be used are 1:1 initial ratio and 2:1 final ratio; 1.6:1 initial ratio and 3.2:1 final ratio; etc. The employment of the first lever 26 which is both pivotable on its pivot mount and concurrently movable in an arcuate translatory manner, guided by the brake control arm and the second lever (both of which pivot about fixed points during brake actuation), with the output member connected to the first lever as described, contributes to the success of the inventive structure.

The embodiments of the invention in which an exclusive property or privilege is claimed are defined as follows:

1. A variable ratio brake pedal mechanism acting through a full brake actuating stroke to increase the ratio of input movement to output movement from an initial ratio to an intermediate ratio and then a final ratio which is substantially greater than the initial ratio by an order of about two times the initial ratio, said mechanism comprising:

a brake pedal arm pivoted on a first fixed point at one arm end and having a brake pedal thereon at the other arm end actuatable arcuately about said first fixed point in the brake applying direction through a defined arc of movement of said pedal arm;

a first lever having a center area pivot point pivotally attached to said brake pedal arm at a pivot point thereon intermediate the pedal arm ends, said first lever having first and second pivots thereon which are spaced from said center area pivot point;

a pivot control member having thereon a fixed pivot spaced from said first fixed point and pivotally engaging said first lever first pivot;

and an output member pivotally attached to said first lever second pivot and extending in a generally tangential direction relative to the arc of movement of said intermediate pedal arm pivot point as said pedal arm is moved through said defined pedal arm arc of movement to transmit a brake actuating force generally axially of said output member with said pivot control member cooperating with and controlling pivoted movement of said first lever so that said first lever moves in a defined arc about said pedal arm intermediate pivot point and simultaneously moves in translation with arcuate movement of said pedal arm intermediate pivot point so that the effective distance traversed by said pedal arm intermediate pivot point relative to the effective distance traversed by said first lever second pivot changes to vary the effective ratio of the generally axial movement of said output member to arcuate movement of said brake pedal from said initial ratio to said intermediate and final ratios as said brake pedal arm is moved throughout said defined pedal arm arc of movement in the brake applying direction.

2. A variable ratio brake pedal mechanism acting through a full brake actuating stroke to increase the ratio of input movement to output movement from an initial ratio with a range extending from about 0.7:1 to about 1.6:1, to a final ratio within a range extending from about 1.4:1 to about 3.2:1, said mechanism comprising:

a brake pedal arm pivoted on a first fixed point at one arm end and having a brake pedal thereon at the other arm end actuatable arcuately about said fixed point in the brake applying direction through a defined arc of movement of said pedal arm;

a first lever having a center area pivot point pivotally attached to said brake pedal arm at a pivot point thereon intermediate the pedal arm ends, said first lever having opposite ends forming pivots;

a second lever having one end pivoted on a fixed point spaced from said first fixed point and closer to said first fixed point than is said intermediate pedal arm pivot point, and another end pivotally attached to one of said first lever end pivots;

and an output member pivotally attached to the other of said first lever end pivots and extending in a generally tangential direction relative to the arc of movement of said intermediate pedal arm pivot point as said pedal arm is moved through said defined pedal arm arc of movement to transmit a brake actuating force generally axially of said output member with said second lever moving in a defined arc greater than said defined pedal arm arc of movement and said first lever moving in a defined arc about said pedal arm intermediate pivot point and simultaneously moves in translation with arcuate movement of said pedal arm intermediate pivot point so that the first effective distance from said first fixed point to said first lever other end pivot decreases as the second effective distance from said brake pedal increases to increase the effective ratio of the arcuate movement of said brake pedal to the generally axial movement of said output member from said initial ratio to said final ratio as said brake pedal arm is moved throughout said defined pedal arm arc of movement in the brake applying direction.

* * * * *